A. BABCOCK.
DISH WASHING APPARATUS.
APPLICATION FILED JULY 11, 1910.
970,872.
Patented Sept. 20, 1910.
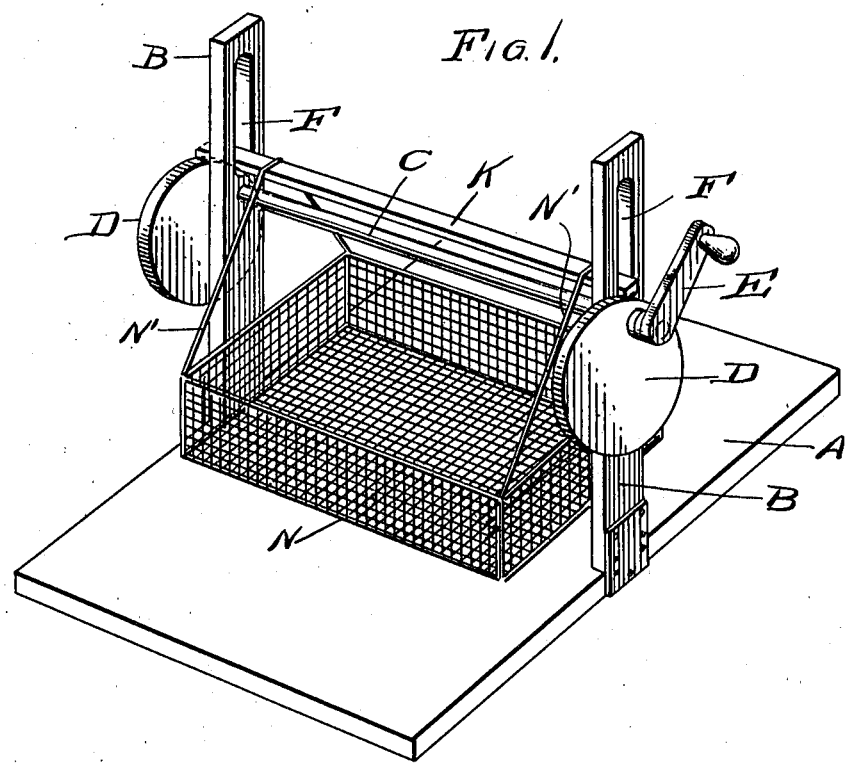
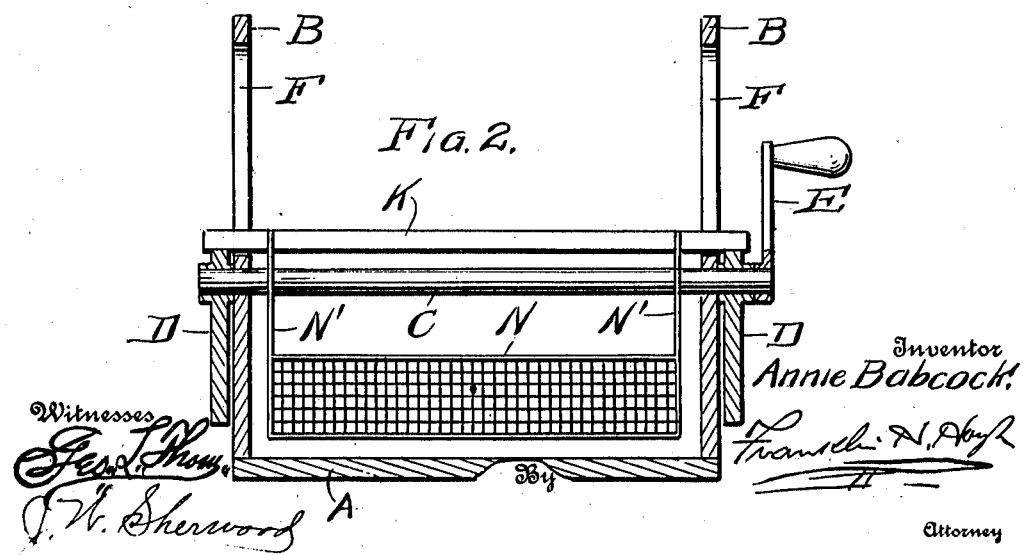
Inventor
Annie Babcock

UNITED STATES PATENT OFFICE.

ANNIE BABCOCK, OF MINNEAPOLIS, MINNESOTA.

DISH-WASHING APPARATUS.

970,872.

Specification of Letters Patent. Patented Sept. 20, 1910.

Application filed July 11, 1910. Serial No. 571,528.

*To all whom it may concern:*

Be it known that I, ANNIE BABCOCK, a citizen of the United States, residing at Minneapolis, in the county of Hennepin and State of Minnesota, have invented certain new and useful Improvements in Dish-Washing Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for washing dishes and consists of a simple and efficient device whereby dishes may be thoroughly cleansed by being placed in an open work receptacle or basket and adapted, as a crank or handle is turned, to be raised and lowered in a receptacle containing water.

The invention comprises various details of construction, combinations and arrangements of parts which will be hereinafter fully described and then specifically defined in the appended claims.

I illustrate my invention in the accompanying drawings, in which:—

Figure 1 is a perspective view of a dish washing apparatus embodying the features of my invention, and Fig. 2 is a vertical sectional view through the same.

Reference now being had to the details of the drawings by letter, A designates the base of the device from which rise standards B, apertured for the reception of the shaft C, having eccentrics D mounted, one upon each end thereof, on which shaft a handle E is mounted. Said standards are provided with elongated slots F, and K is a bar mounted in said slots and adapted to rest upon the circumferences of said eccentrics. A basket, preferably of wire open work and designated by letter N, is suspended from said bar by the handles N' extending over the latter.

The dishes to be cleansed are placed within the basket which rests in a pan or receptacle of water. By turning the handle, the eccentrics are rotated and the bar is caused to be raised and lowered, riding upon the circumference of the eccentrics. As the bar rises and lowers, it being guided in said slots, the basket will be moved therewith and be raised and lowered in the water within the receptacle, thus thoroughly cleansing the dishes.

What I claim to be new is:—

1. A dish washing apparatus comprising a horizontally disposed, rotatable shaft, eccentrics fixed thereto, means for rotating the same, a bar riding upon the circumference of said eccentrics, means for guiding the bar as it is raised and lowered, and a dish receptacle suspended from said bar.

2. A dish washing apparatus comprising upright standards which are vertically slotted, a shaft journaled in said standards, eccentrics fixed to said shaft, a bar resting upon the circumferences of said eccentrics and guided within said slots, a dish holding receptacle suspended from said bar, and means for rotating the eccentrics.

In testimony whereof I hereunto affix my signature in the presence of two witnesses.

ANNIE BABCOCK.

Witnesses:
GEO. C. KING,
MAY S. COOPER.